United States Patent
Daly et al.

(10) Patent No.: US 8,037,151 B1
(45) Date of Patent: Oct. 11, 2011

(54) PREDETERMINED EMERGENCY ALERT MESSAGES

(75) Inventors: Brian Kevin Daly, Seattle, WA (US); DeWayne Allan Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 896 days.

(21) Appl. No.: 11/937,048

(22) Filed: Nov. 8, 2007

(51) Int. Cl.
*G06F 15/16* (2006.01)
(52) U.S. Cl. .......................................... 709/207
(58) Field of Classification Search .................. 455/404, 455/404.1, 414.2, 466; 709/206, 207, 219, 709/224, 225; 340/426.21
See application file for complete search history.

(56) References Cited

U.S. PATENT DOCUMENTS

| | | | | |
|---|---|---|---|---|
| 6,842,628 B1 * | 1/2005 | Arnold et al. | ............... | 455/556.2 |
| 2002/0120698 A1 * | 8/2002 | Tamargo | ...................... | 709/206 |
| 2002/0160745 A1 * | 10/2002 | Wang | ........................... | 455/404 |
| 2004/0103158 A1 * | 5/2004 | Vella et al. | ..................... | 709/206 |
| 2004/0143385 A1 * | 7/2004 | Smyth et al. | .................. | 701/117 |
| 2005/0032525 A1 * | 2/2005 | Gasbarro | ................... | 455/456.1 |
| 2005/0037728 A1 * | 2/2005 | Binzel et al. | ............... | 455/404.1 |
| 2006/0040639 A1 * | 2/2006 | Karl et al. | .................. | 455/404.1 |
| 2007/0123220 A1 * | 5/2007 | Weiser et al. | .............. | 455/412.1 |
| 2009/0023418 A1 * | 1/2009 | Grevers, Jr. | ............... | 455/404.1 |
| 2009/0030563 A1 * | 1/2009 | Beacham, Jr. | .................... | 701/3 |

* cited by examiner

*Primary Examiner* — Joshua Joo
*Assistant Examiner* — Jonathan Willis
(74) *Attorney, Agent, or Firm* — Woodcock Washburn LLP (57) ABSTRACT

Wireless emergency alert messages are provide to mobile devices as predetermined (canned) messages. The predetermined messages are size limited to conserve network resources and accommodate various mobile devices. In an example configuration, the predetermined emergency alert messages are created based upon the attributes of the common alerting protocol (CAP). To provide greater flexibility to authorized originators of emergency alert messages, the predetermined emergency alert message can include free-form text or characters as provided by the authorized originator.

12 Claims, 6 Drawing Sheets

FIGURE 6

PREDETERMINED EMERGENCY ALERT MESSAGES

TECHNICAL FIELD

The technical field generally relates to communications systems and more specifically relates to the broadcast of Emergency Alert System (EAS) text messages.

BACKGROUND

The wireless Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. Due to broadcast capabilities, bandwidth constraints, and limitations of mobile devices (e.g., limited number of characters displayable on the mobile device), the size of the EAS message is limited. However, initiators of EAS messages often are not aware of the size limitations. Thus, the limitation upon the size of an EAS message can be problematic. For example, approximately 50,000 emergency alert initiators exist throughout the United States and Canada. When notified of similar emergencies, emergency alert initiators should generate similar type EAS messages. Unfortunately, all emergency alert initiators do not receive identical training, and some emergency alert initiators tend to adlib by including additional information in the EAS messages. Emergency alert initiators may include undesired/unnecessary information (e.g., web addresses for wireless data services, phone numbers to call for more information) in the EAS text message. The inclusion of this undesired/unnecessary information can result in network congestion. Training is another problem. Training approximately 50,000 emergency alert initiators about updates to the EAS messages could be overwhelming and result in inconsistent EAS messages.

SUMMARY

Predetermined alert messages, limited in size, are utilized to provide an indication of an alert to a mobile device. The predetermined alert messages are generated in accordance with a protocol used to provide an emergency alert message. In an example configuration, upon receipt of an emergency alert message provided by an emergency alert initiator, fields in the protocol utilized to transmit the emergency alert message are analyzed to select a respective predetermined alert message from a list of predetermined alert messages. As a default, predetermined alert text messages are provided to mobile devices. However, if the emergency alert initiator that sent the emergency alert message is an authorized emergency alert initiator, free form text provided by the authorized emergency alert initiator is provided instead of, or with, the predetermined alert message.

BRIEF DESCRIPTION OF THE DRAWINGS

The foregoing and other objects, aspects and advantages of EAS channel assignment will be better understood from the following detailed description with reference to the drawings.

DETAILED DESCRIPTION OF ILLUSTRATIVE EMBODIMENTS

Upon receiving notification of an existing and/or pending emergency, an emergency alert initiator, such as a member of law enforcement, local government, or an agency (e.g., National Weather Service), or the like, provides an emergency alert message for distribution to mobile devices. In an example embodiment of the herein described methods and systems for generating and implementing predetermined emergency alert messages, a predetermined (canned) emergency alert message is provided to mobile devices instead of the emergency alert message generated by the emergency alert initiator. In an example embodiment, the size (e.g., character length, number of bytes) of the predetermined alert message is limited to conserve network resources and to accommodate limitations of mobile devices. For example, a limitation of 90 English characters for a text based alert message to wireless devices can be established. The predetermined alert messages are generated based upon attributes of the emergency alert message. In an example embodiment, the predetermined emergency alert messages are generated based upon attributes of the protocol (e.g., the common alerting protocol, CAP) utilized to transmit the emergency alert message. Additionally, if the initiator of the emergency alert message is an authorized initiator, a free form alert message is provided instead of, or in conjunction with, the predetermined emergency alert message.

Figure 1:
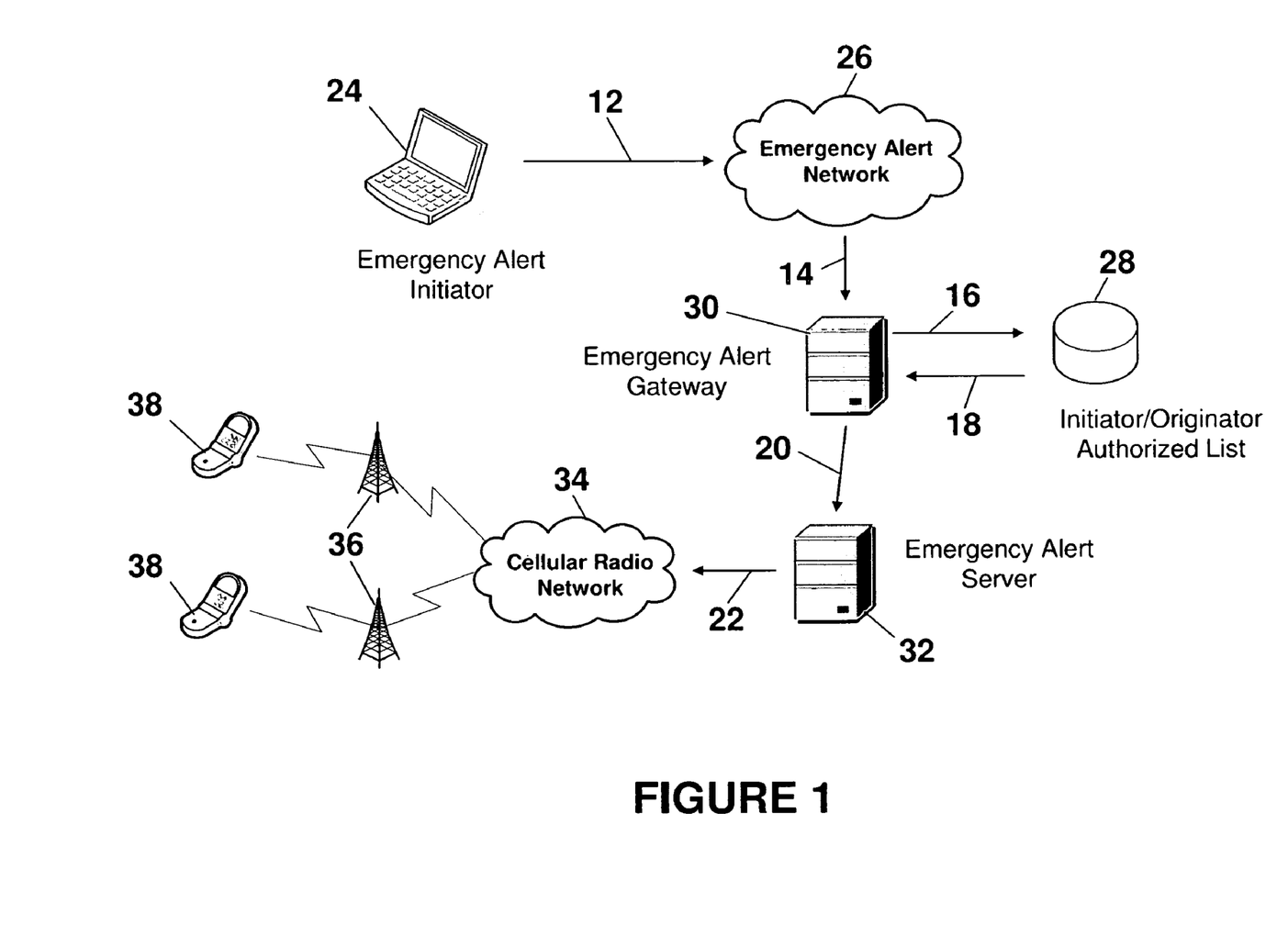
FIG. 1 is a flow diagram of an example process and system for generating and distributing a predetermined emergency alert message.

FIG. 1 is a flow diagram of an example process and system for generating and distributing a predetermined emergency alert message. At step 12, an emergency alert message is provided to the emergency alert network 26 by an emergency alert initiator 24. In an example embodiment, the emergency alert network 26 is a network configured to accommodate Emergency Alert System (EAS) messages. The emergency alert initiator 24 can be any appropriate emergency alert initiator. For example, an emergency alert initiator 24 can be a government official, a member of a police department, an organization such as the National Weather Service, or the like. Thus the emergency alert initiator 24 could be any of thousands of emergency alert initiators located throughout the United States and Canada.

When the emergency alert initiator 24 receives notification of an existing or pending emergency, the emergency alert initiator 24 generates an emergency alert message formatted in conformance with a protocol for transmission to the emergency alert network 26. The transmission of the emergency alert message, at step 12, can be via a wired interface, a wireless interface, or a combination thereof. The protocol can comprise any appropriate protocol. In an example embodiment, the emergency alert message provided at step 12 is formatted in accordance with the common alerting protocol (CAP). The common alerting protocol is a general format for exchanging all-hazard emergency alerts and public warnings over various wireless networks. A CAP alert message (an alert message formatted in accordance with the common alerting protocol), comprises segments, or fields, indicative of various characteristics of emergency event. For example, the CAP comprises fields indicative of the sender of the emergency alert message, the type of event, the expiration of the event, the urgency of the event, the severity of the event, the certainty of the event, and the intended audience of the event.

At step 14, the emergency alert message is provided to a wireless emergency alert gateway 30. The transmission of the emergency alert message, at step 14, can be via a wired interface, a wireless interface, or a combination thereof. The emergency alert gateway 30 can comprise any appropriate processor, server, or the like. Upon receipt of the emergency alert message (at step 14), the emergency alert gateway 30 analyzes the received emergency alert message to generate, or select, a predetermined emergency alert message and to determine if the initiator/originator of the emergency alert message is an authorized emergency alert initiator/originator.

Figure 2:
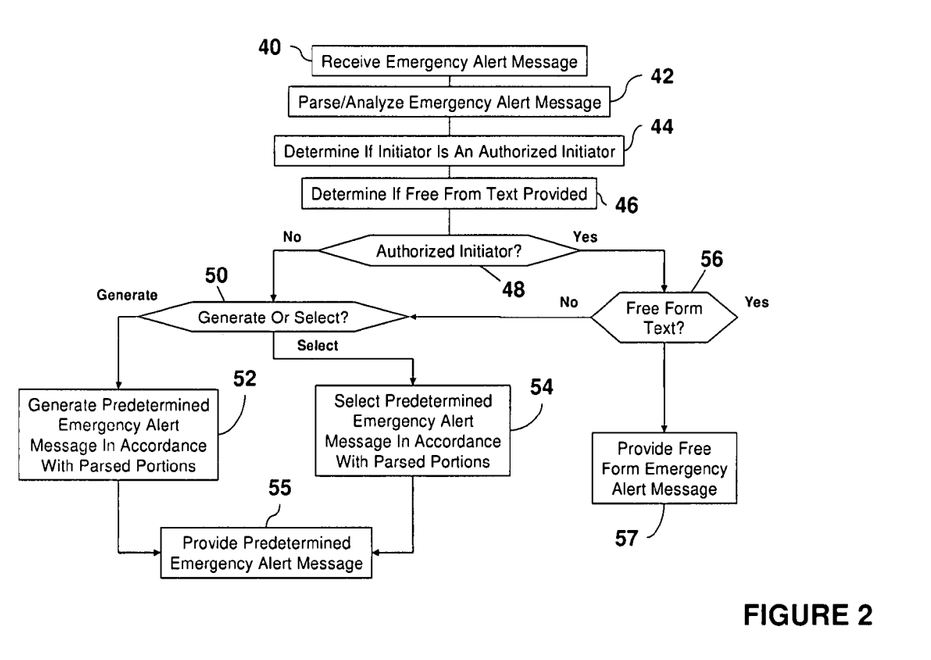
FIG. 2 is a flow diagram of an example process for analyzing an emergency alert message.

FIG. 2 is a flow diagram of an example process for analyzing an emergency alert message. In an example embodiment, the process depicted in FIG. 2 is performed by the emergency alert gateway 30. It is to be understood however that the process depicted in FIG. 2 can be accomplished by any appropriate processor, such as the emergency alert gateway 30, the emergency alert server 32, or a combination thereof. The emergency alert message is received by the emergency alert gateway at step 40. At step 42, the received emergency alert message is parsed and analyzed. The received emergency alert message is parsed in order to analyze the fields of the message in accordance with the protocol used to transmit the message. In an example embodiment, the received emergency alert message is formatted in conformance with the CAP. Fields indicative of various characteristics of the emergency event are analyzed. In an example embodiment, the fields analyzed include at least one of the fields indicative of the sender of the emergency alert message, the type of event, the expiration of the event, the urgency of the event, the severity of the event, the certainty of the event, or the intended audience of the event.

Once the predetermined emergency alert message has been analyzed (step 40), it is determined, at step 42, if the initiator, or originator, is an authorized initiator/originator. In an example embodiment, the initiator, or originator, of the alert message is determined from the analysis conducted at step 40. That is, the emergency alert message is parsed and the field associated with the sender of the emergency alert message is utilized. It is determined, at step 44, if the initiator/originator of the emergency alert message is an authorized initiator/originator of the emergency alert message. The determination as to whether the initiator/originator is authorized can be accomplished via any appropriate means. In an example embodiment, the database 28 comprises a list of authorized initiators/originators. In accordance with this embodiment, it is determined, at step 44, if the initiator/originator is authorized by checking the list in the database 28, or any appropriate storage means configured to contain a list of authorized initiators/originators. At step 46 it is determined if the emergency alert message comprises free form text. The free form text can be part of the emergency alert message, accompany the emergency alert message, or a combination thereof.

If (step 48) the initiator/originator of the emergency alert message is an authorized initiator/originator, the implication is that the initiator/originator of the emergency alert message is aware of the limitations placed upon the size of the emergency alert message. Accordingly, an authorized initiator/originator is permitted to generate an emergency alert message comprising free-form text or characters. If (step 48) the initiator/originator is an authorized initiator/originator and if (step 56) free form text has been provided, the predetermined emergency alert message can comprise a free-form text or characters, and is provided as such at step 57.

If (step 48) the initiator/originator is not authorized the process proceeds to step 50. If (step 48), the initiator/originator is authorized and if (step 56) no free form text is provided, the process proceeds to step 50. At step 50, it is determined if the predetermined emergency alert message is to be generated or selected. Once the received emergency alert message has been parsed and analyzed (step 42), appropriate information is extracted in order to generate and/or select a predetermined emergency alert message. A predetermined emergency alert message can be selected or generated. If a predetermined emergency alert message is to be selected, it is selected from a list of predetermined emergency alert messages at step 54. The list of predetermined emergency alert messages can reside in any appropriate storage. For example, the list of predetermined emergency alert messages can reside, as depicted in FIG. 1, in the emergency alert gateway 30, in emergency alert server 32, and/or in a database such as database 28. At step 54 the appropriate predetermined emergency alert message is selected from the list in accordance with information extracted at step 42. The selected predetermined emergency alert message is provided at step 55. For example, if the information extracted at step 42 indicated that the emergency is a tornado, a predetermined message selected from the list would indicate that the emergency is a tornado (e.g., "Tornado Warning"). Additionally, the predetermined emergency alert message can include additional information such as the duration of the emergency and the location of the emergency (e.g., "Tornado Warning Until 6:00 PM Eastern in Camden County").

At step 50, if it is determined that the predetermined emergency alert message is to be generated, the predetermined emergency alert message is generated at step 52. Information obtained at step 42 is used to generate a predetermined emergency alert message. Thus, rather than selecting a predetermined emergency alert message from a list, the predetermined emergency alert message is generated "on-the-fly". The predetermined emergency alert message can be generated in accordance with an algorithm that generates a consistent emergency alert message given consistent information (e.g., information obtained at step 42). Generating a predetermined emergency alert message rather than selecting a predetermined emergency alert message is advantageous if memory resources are scarce. The generated predetermined emergency alert message is provided at step 55. In an example embodiment, the default process is to provide the predetermined emergency alert message without of free-form text or characters. This default can be overridden however if it is determined that the initiator/originator is an authorized initiator/originator.

Referring again to FIG. 1, upon receipt of the emergency alert message at step 14, the emergency alert gateway 30 processes the received emergency alert message as described with respect to the process depicted in FIG. 2. In an example embodiment, at step 16, the emergency alert gateway 30 accesses a database 28 to determine if the initiator/originator is authorized. The database 28 can comprise any appropriate storage. In an example embodiment the database 28 comprises a list of authorized initiators/originators. At step 18, an indication is provided to the emergency alert gateway 30 as to whether the initiator/originator is authorized. If the initiator/ originator is an authorized initiator/originator, a predetermined emergency alert message comprising optional free-form text or characters, is provided to the emergency alert server 32 at step 20. Thus, if the initiator/originator is an authorized initiator/originator and free-form text or characters accompany the emergency alert message provided at step 14, the free-form text or characters are provided as the predetermined emergency alert message at step 20. If the initiator/originator is an authorized initiator/originator, and no free-form text or characters accompany the emergency alert message provided at step 14, the selected or generated default predetermined emergency alert message is provided at step 20. If, at step 18, an indication is provided to the emergency alert gateway 30 that the initiator/originator is not an authorized initiator/originator, the selected or generated (e.g., as described with respect to the process depicted in FIG. 2) predetermined emergency alert message is provided at step 20.

Thus, if it is determined that the initiator/originator of the emergency alert message is not authorized to deviate from the format of the predetermined emergency alert message, the predetermined emergency alert message is provided at step 20. If it is determined that the initiator/originator of the emergency alert message is authorized to deviate from the format of the predetermined emergency alert message, the predetermined emergency alert message, formatted in accordance with the authorized initiator/originator format, is provided at step 20.

The emergency alert server 32, upon receiving a predetermined emergency alert message, determines the appropriate mobile devices 38 to receive the predetermined emergency alert message. At step 22, the emergency alert server 32 provides the predetermined emergency alert message to the appropriate mobile devices 38 via a cellular radio network 34 and transmitters 36.

The mobile devices 38 are representative of any appropriate type of device that can receive emergency alert messages. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Figure 3:
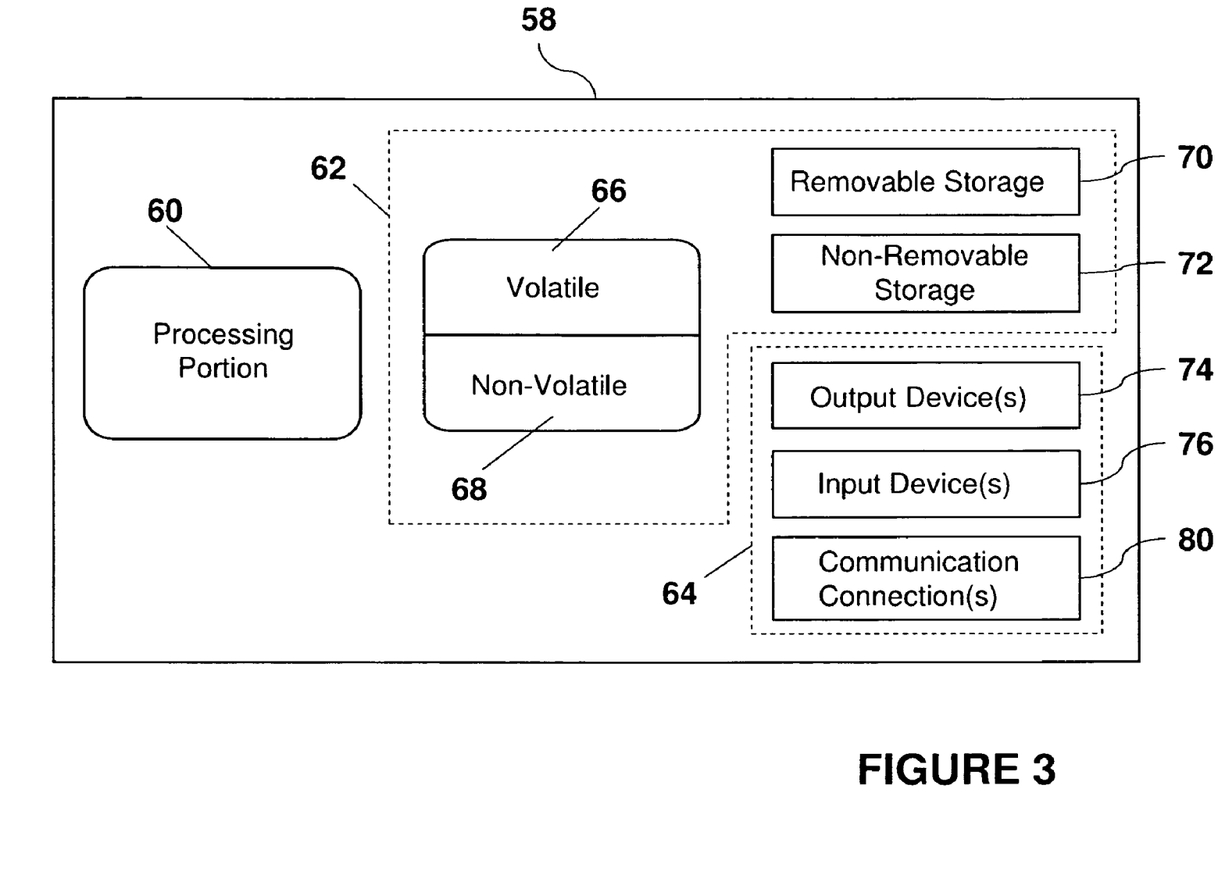
FIG. 3 is a block diagram of an example processor for generating and/or selecting and distributing a predetermined emergency alert message.

FIG. 3 is a block diagram of an example processor 58 for generating and/or selecting and distributing a predetermined emergency alert message. In an example configuration, the processor 58 comprises the emergency alert gateway 30, the emergency alert server 32, the database 28, or a combination thereof. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications therebetween. The input/output portion 64 is capable of providing and/or receiving components utilized to generate/select and distribute a predetermined emergency alert message as described above. For example, as described above, the input/output portion 64 is capable of providing/receiving an emergency alert message from an emergency alert network, a request to a database for determining if an initiator/originator is authorized, an indication as to whether an initiator/originator is authorized, a predetermined emergency alert message with or without free form text or characters, or a combination thereof. The processing portion 60 is capable of parsing and analyzing a received emergency alert message, generating a predetermined emergency alert message, selecting a predetermined emergency alert message, or a combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with generating/selecting and distributing a predetermined emergency alert message. For example, as described above, the memory portion is capable of storing the list of a predetermined emergency alert messages, a list of authorized initiators/originators, or a combination thereof. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 80 that allow the processor 58 to communicate with other devices, for example. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included.

The following description sets forth some exemplary telephony radio networks and non-limiting operating environments in which predetermined emergency alert messages can be implemented. The below-described operating environments should be considered non-exhaustive, however, and thus the below-described network architectures merely show how predetermined emergency alert messages can be incorporated into existing network structures and architectures. It can be appreciated, however, that predetermined emergency alert messages can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS channel assignment can be applied independently of the method for data transport, and do not depend on any particular network architecture, or underlying protocols.

Figure 4:
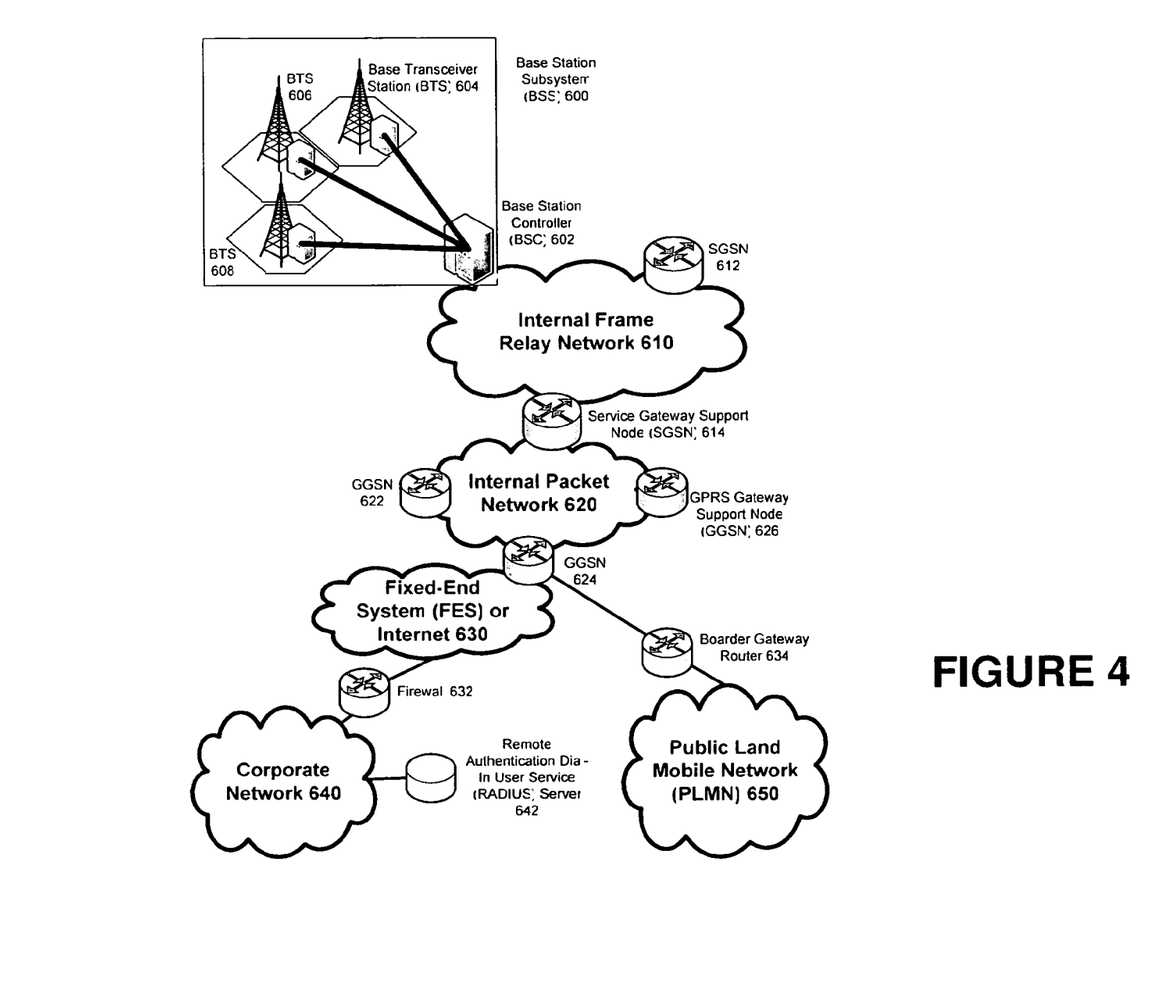
FIG. 4 depicts an overall block diagram of an exemplary packet-based mobile cellular network environment, such as a GPRS network, in which predetermined emergency alert messages can be practiced.

FIG. 4 depicts an overall block diagram of an exemplary packet-based mobile cellular network environment, such as a GPRS network, in which the system for implementing predetermined emergency alert messages can be practiced. In an example configuration, the cellular radio network 34 and towers 36 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
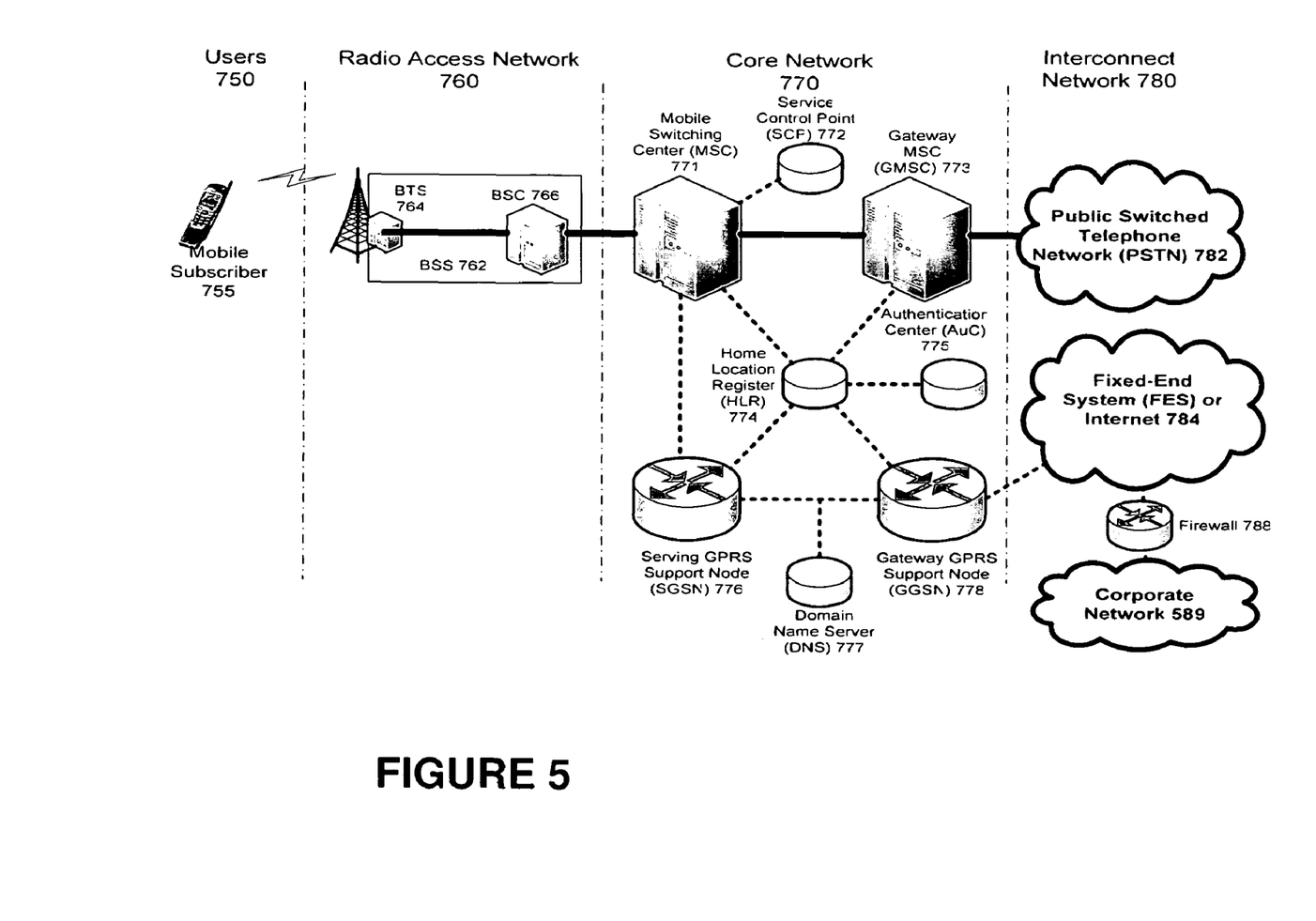
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile device 12. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772.

The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of predetermined emergency alert messages can include but are not limited to Gateway GPRS Support Node tables, Fixed End System router tables, firewall systems, VPN tunnels, and any number of other network elements as required by the particular digital network.

Figure 6:
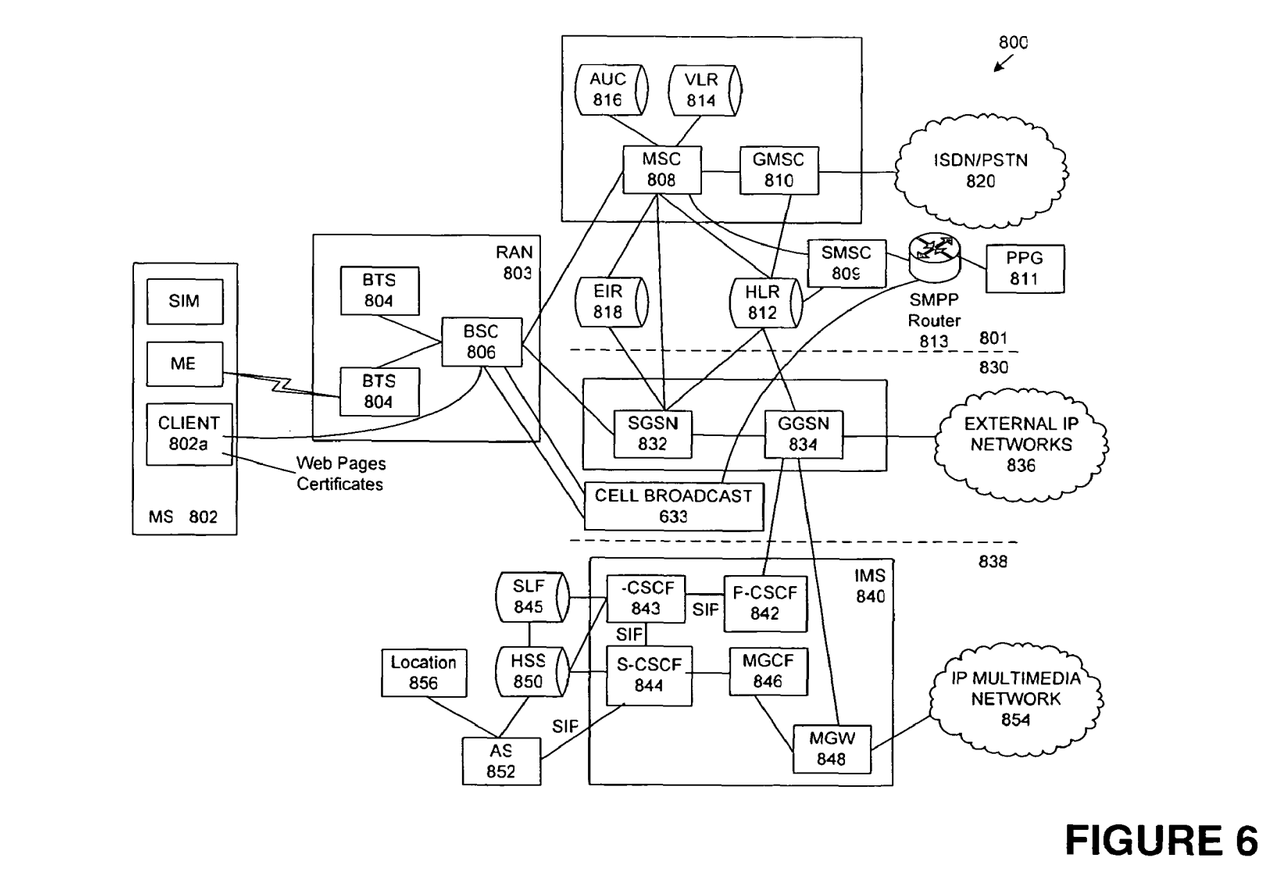
FIG. 6 illustrates an example alternate block diagram of an exemplary GSM/GPRS/IP multimedia network architecture in which predetermined emergency alert messages can be incorporated.

FIG. 6 illustrates another exemplary block diagram view of a GSM/GPRS/IP multimedia network architecture 800 in which predetermined emergency alert messages can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of predetermined emergency alert messages have been described in connection with various computing devices, the underlying concepts can be applied to any computing device or system capable of implementing predetermined emergency alert messages. The various techniques described herein can be implemented in connection with hardware or software or, where appropriate, with a combination of both. Thus, the methods and apparatus for generating, selecting, and/or implementing predetermined emergency alert messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing predetermined emergency alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for predetermined emergency alert messages also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing predetermined emergency alert messages. When implemented on a general-purpose processor, the program code combines with the processor to provide a unique apparatus that operates to invoke the functionality of EAS channel assignment. Additionally, any storage techniques used in connection with predetermined emergency alert messages can invariably be a combination of hardware and software.

While predetermined emergency alert messages have been described in connection with the various embodiments of the various figures, it is to be understood that other similar embodiments can be used or modifications and additions can be made to the described embodiment for performing the same function of predetermined emergency alert messages without deviating therefrom. For example, one skilled in the art will recognize that a system for implementing predetermined emergency alert messages as described may apply to any environment, whether wired or wireless, and may be applied to any number of devices connected via a communications network and interacting across the network. Therefore, predetermined emergency alert messages should not be limited to any single embodiment, but rather should be construed in breadth and scope in accordance with the appended claims.

What is claimed is:

1. A method comprising:
receiving a first emergency alert message;
analyzing, via a processor, the received first emergency alert message for determining at least one characteristic of an emergency indicated therein;
determining if the received first emergency alert message comprises free form text that deviates from a format of a predetermined emergency alert message associated with the at least one characteristic;
if the received first emergency alert message does not comprise free form text, selecting a predetermined emergency alert message from a plurality of predetermined emergency alert messages in accordance with at least one of the at least one determined characteristic, and providing a second emergency alert message comprising the selected predetermined emergency alert message;
if the received first emergency alert message comprises free form text, determining if an originator of the first emergency alert message is an authorized originator authorized to deviate from the format of the predetermined emergency alert message;
if the received first emergency alert message comprises free form text and the originator of the first emergency alert message is an authorized originator, generating a second emergency alert message comprising the free form text; and
if the received first emergency alert message comprises free form text and the originator of the first emergency alert message is not an authorized originator, selecting the predetermined emergency alert message from the plurality of predetermined emergency alert messages in accordance with at least one of the at least one determined characteristic, and providing a second emergency alert message comprising the selected predetermined emergency alert message, wherein the selected predetermined emergency alert message does not contain the free form text.

2. The method in accordance with claim 1, wherein:
the first emergency alert message is formatted in accordance with a wireless emergency message protocol; and
at least one field of the protocol is analyzed to determine the at least one characteristic.

3. The method in accordance with claim 2, wherein the protocol is a common alerting protocol (CAP).

4. The method of claim 1, wherein each second emergency alert message is size limited.

5. A system comprising:
an input/output portion configured to:
receive a first emergency alert message; and
provide a second emergency alert message;
a processing portion configured to:
analyze the received first emergency alert message for determining at least one characteristic of an emergency indicated therein;
determine if the received first emergency alert message comprises free form text that deviates from a format of a predetermined emergency alert message associated with the at least one characteristic;
if the received first emergency alert message does not comprise free form text, select a predetermined emergency alert message from a plurality of predetermined emergency alert messages in accordance with at least one of the at least one determined characteristic, and providing a second emergency alert message comprising the selected predetermined emergency alert message;

if the received first emergency alert message comprises free form text, determine if an originator of the first emergency alert message is an authorized originator authorized to deviate from the format of the predetermined emergency alert message;

if the received first emergency alert message comprises free form text and the originator of the first emergency alert message is an authorized originator, generate the second emergency alert message comprising the free form text; and if the received first emergency alert message comprises free form text and the originator of the first emergency alert message is not an authorized originator, select the predetermined emergency alert message from the plurality of predetermined emergency alert messages in accordance with at least one of the at least one determined characteristic, and generate the second emergency alert message comprising the selected predetermined emergency alert message, wherein the selected predetermined emergency alert message does not contain the free form text; and a memory portion configured to store at least one of:

the plurality of predetermined emergency alert messages; and a list of authorized originators of the emergency alert message.

6. The system in accordance with claim 5, wherein:

the first emergency alert message is formatted in accordance with a wireless emergency message protocol; and at least one field of the protocol is analyzed to determine the at least one characteristic.

7. The system in accordance with claim 6, wherein the protocol is a common alerting protocol (CAP).

8. The system of claim 5, wherein each the second emergency alert message is size limited.

9. A computer-readable storage medium, wherein the computer-readable storage medium is not a signal, the computer-readable storage medium having stored thereon computer-executable instructions for performing the steps of:

receiving a first emergency alert message;

analyzing the received first emergency alert message for determining at least one characteristic of an emergency indicated therein;

determining if the received first emergency alert message comprises free form text that deviates from a format of a predetermined emergency alert message associated with the at least one characteristic;

if the received first emergency alert message does not comprise free form text, selecting a predetermined emergency alert message from a plurality of predetermined emergency alert messages in accordance with at least one of the at least one determined characteristic, and providing a second emergency alert message comprising the selected predetermined emergency alert message;

if the received first emergency alert message comprises free form text, determining if an originator of the first emergency alert message is an authorized originator authorized to deviate from the format of the predetermined emergency alert message;

if the received first emergency alert message comprises free form text and the originator of the first emergency alert message is an authorized originator, generating a second emergency alert message comprising the free form text; and if the received first emergency alert message comprises free form text and the originator of the first emergency alert message is not an authorized originator, selecting the predetermined emergency alert message from the plurality of predetermined emergency alert messages in accordance with at least one of the at least one determined characteristic, and providing the second emergency alert message comprising the selected predetermined emergency alert message, wherein the selected predetermined emergency alert message does not contain the free form text.

10. The computer-readable storage medium in accordance with claim 9, wherein:

the first emergency alert message is formatted in accordance with a wireless emergency message protocol; and at least one field of the protocol is analyzed to determine the at least one characteristic.

11. The computer-readable storage medium in accordance with claim 10, wherein the protocol is a common alerting protocol (CAP).

12. The computer-readable storage medium in accordance with claim 9, wherein each second emergency alert message is size limited.

* * * * *